R. RUEMELIN.
FRICTION CLUTCH.
APPLICATION FILED AUG. 31, 1914.
1,176,321.
Patented Mar. 21, 1916.
2 SHEETS—SHEET 1.
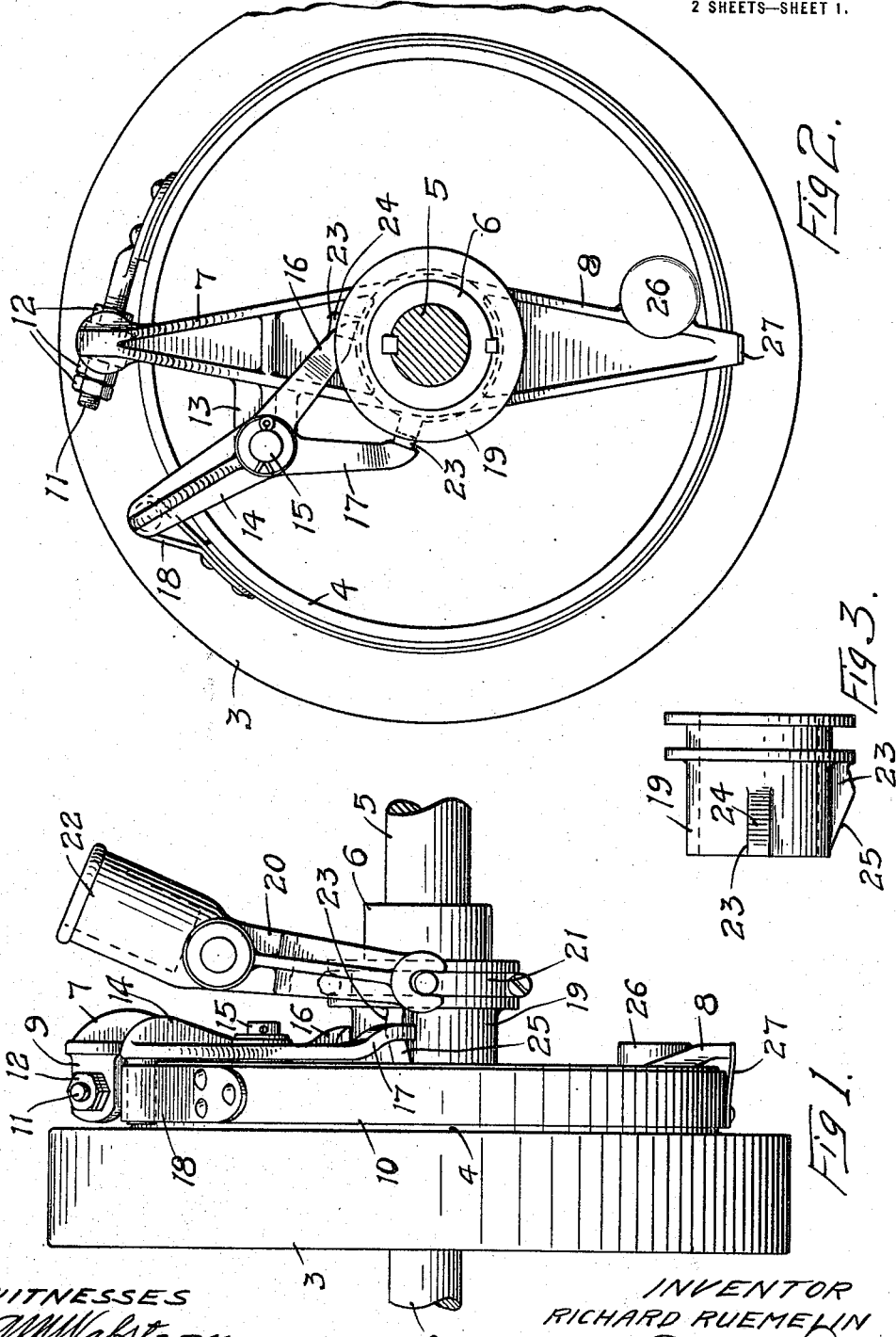
WITNESSES
INVENTOR
RICHARD RUEMELIN
BY
ATTORNEYS R. RUEMELIN.
FRICTION CLUTCH.
APPLICATION FILED AUG. 31, 1914.
1,176,321.
Patented Mar. 21, 1916.
2 SHEETS—SHEET 2.
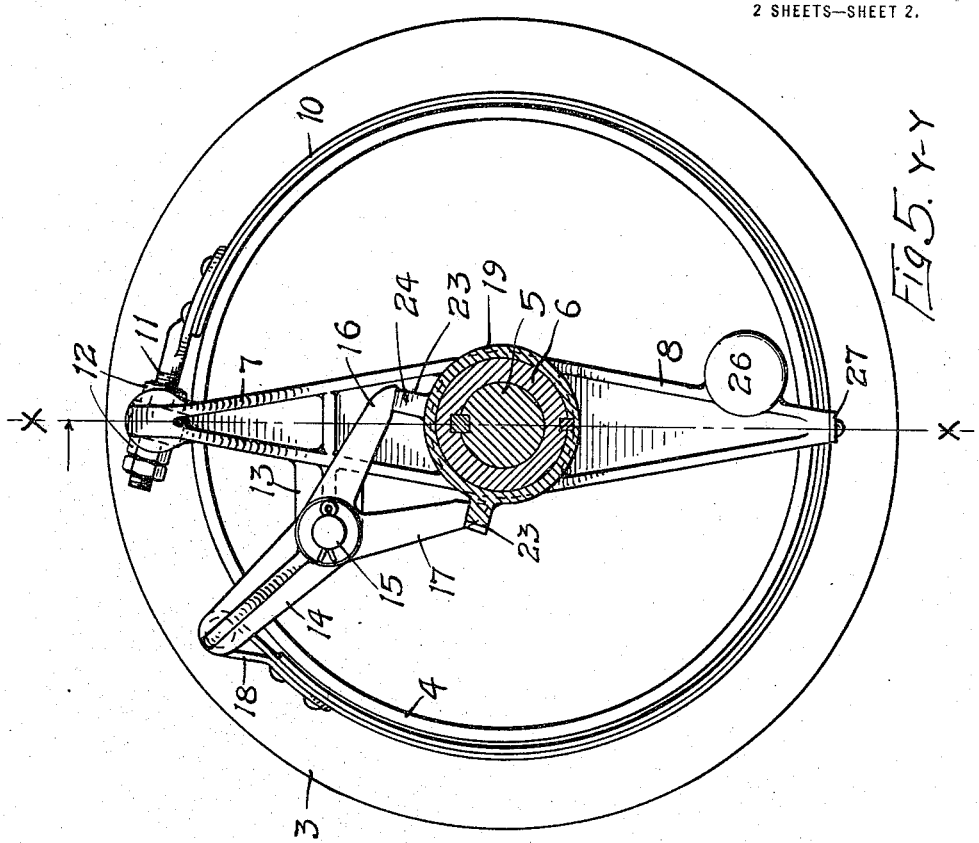
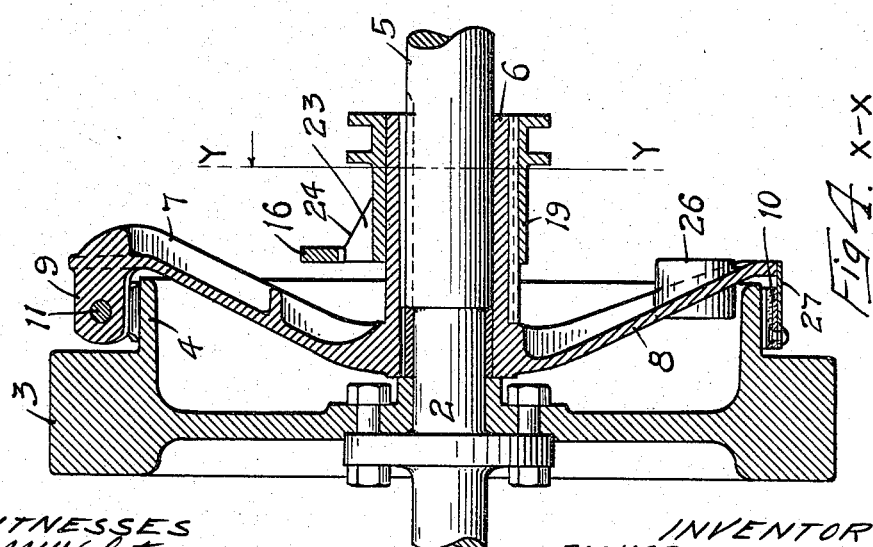
WITNESSES
INVENTOR
RICHARD RUEMELIN
BY
ATTORNEYS

UNITED STATES PATENT OFFICE.

RICHARD RUEMELIN, OF MINNEAPOLIS, MINNESOTA, ASSIGNOR TO MINNEAPOLIS STEEL & MACHINERY COMPANY, OF MINNEAPOLIS, MINNESOTA, A CORPORATION.

FRICTION-CLUTCH.

1,176,321.  Specification of Letters Patent.  Patented Mar. 21, 1916.

Application filed August 31, 1914. Serial No. 859,346.

*To all whom it may concern:*

Be it known that I, RICHARD RUEMELIN, a citizen of the United States, resident of Minneapolis, in the county of Hennepin and State of Minnesota, have invented certain new and useful Improvements in Friction-Clutches, of which the following is a specification.

The object of my invention is to provide a clutch device in which the clutch member is actuated positively to seat and unseat it without the aid of springs or similar devices.

A further object is to provide a clutch device of simple construction and one which will be positive and reliable in its action.

Other objects of the invention will appear from the following detailed description.

The invention consists generally in the constructions and combinations all as hereinafter described and more particularly pointed out in the claims.

In the accompanying drawings forming part of this specification, Figure 1 is a side view of an engine fly wheel showing a portion of the crank shaft and the driven shaft, with my improved clutch device applied thereto, Fig. 2 is a cross sectional view through the driven shaft, with the clutch actuating fork removed, Fig. 3 is a detail view of the clutch sleeve, the movement of which operates the clutch lever in both directions, Fig. 4 is a sectional view on the line x—x of Fig. 5, Fig. 5 is a sectional view on the line y—y of Fig. 4.

In the drawing, 2 represents an engine crank shaft and 3 the fly wheel secured thereto. This wheel is provided with an annular flange 4 having an external friction surface, 5 is a driven shaft concentric with the crank shaft and abutting the same, as indicated in Fig. 4, and 6 is a hub keyed on the driven shaft, and preferably overlapping the joint between the crank shaft and the driven shaft. This hub is provided with outwardly projecting arms 7 and 8. These arms extend radially with respect to the fly wheel to a point beyond the outer surface of the flange 4, and the arm 7 has an extension 9 arranged to overhang the friction surface of the flange 4. A clutch strap 10 is arranged to encircle the flange 4 and has a threaded bolt 11 at one end, adjustably mounted in the extension 9. The lock nuts 12 of this bolt may be adjusted back and forth thereon for the purpose of tightening or loosening the clutch strap as desired. A lug 13 is mounted on the arm 7 and a lever 14 is pivoted at 15 on said lug and provided with arms 16 and 17 diverging from one another in the form substantially of a V, and the outer end of the lever 14 is loosely attached to the looped end of the strap 10.

A sleeve 19 is splined on the hub 6 and is free to slide thereon and is actuated by the forked arm 20 having the usual loose collar 21 connected with the sleeve, the arm 20 having a suitable socket 22 for the insertion of an operating hand lever (not shown). The surface of the sleeve 19 is provided with ears 23 having oppositely inclined cam surfaces 24 and 25 thereon, and the arms 16 and 17 of the lever 14 project into the path of these cam surfaces, as the sleeve 19 is moved back and forth on its supporting hub. When the sleeve is moved inwardly toward the fly wheel the cam surface 25 will engage the arm 17 and rock the lever 14 to tighten the strap on the friction surface and temporarily clamp the crank shaft and the driven shaft together. When the sleeve 19 is moved in the oposite direction the cam surface 24 will engage the arm 16 and move the lever 14 in the other direction, thereby releasing the clutch strap and separating the driven shaft from its operative connection with the fly wheel. Thus each movement of the clutch strap will be positive and reliable and no dependence is put upon springs or similar devices for unseating the clutch as usual in devices of this kind. One movement of the clutch operating lever seats the clutch and the reverse movement positively unseats it.

The arm 8 is preferably provided with a suitable counter-weight in the form preferably of a boss 26, mounted on the lower portion of the arm and a spring plate 27 is preferably riveted to the clutch strap and bears on the lower end of the arm 8 to be put under tension when the clutch strap is seated.

In various ways the details of construction herein shown and described, may be modified and still be within the scope of my invention.

I claim as my invention:

1. A friction clutch comprising a driving and a driven member, one having a friction surface and the other a clamping means, a lever connected with said clamping means and having opposing surfaces and a sleeve having oppositely inclined cam surfaces to engage said opposing surfaces for positively moving said lever in both directions to seat or release said clamping means.

2. A clutch comprising a driving and a driven member, one having a friction surface and the other a clamping means, a lever device connected with said clamping means and having opposing surfaces, a sliding means having oppositely inclined cam surfaces to engage the opposing surfaces of said lever for positively moving it in both directions to seat or release said clamping means.

3. A clutch comprising a driving and a driven member, one having a friction surface and the other a clamping means, a forked lever connected with said clamping means, and means engaging the arms of said fork for oscillating said lever positively in both directions to seat or unseat said clamping means.

4. A clutch comprising a driving and a driven member, one having a friction surface and the other a clamping means, a forked lever connected with said clamping means and a sleeve having oppositely inclined cam surfaces to engage the arms of said fork for positively moving said lever in both directions, to seat or release said clamping means.

5. A clutch comprising a driving member and a driven member, one having a friction surface and the other a clutch strap encircling said surface, a fixed support whereto one end of said strap is connected, a member pivotally supported and attached to the other end of said clutch strap and having opposing surfaces, and means having oppositely inclined cam surfaces for engaging the opposing surfaces of said pivoted member on the opposite side of its pivot from its connection with said clutch strap for positively operating said pivoted member in both directions to seat or unseat said strap.

6. A friction clutch comprising a driving and a driven member, one having a friction surface and the other a means for engaging said surface, a sliding member having lugs thereon provided with oppositely inclined cam surfaces and a device connected with said surface-engaging means and in the path of said cam surfaces and positively actuated thereby in both directions.

In witness whereof, I have hereunto set my hand this 28th day of August, 1914.

RICHARD RUEMELIN.

Witnesses:
EDWARD A. PAUL,
C. H. REHFUSS.

Copies of this patent may be obtained for five cents each, by addressing the "Commissioner of Patents, Washington, D. C."